R. F. C. KEATS.
ROTARY ENGINE.
APPLICATION FILED NOV. 12, 1910.
981,862.
Patented Jan. 17, 1911.
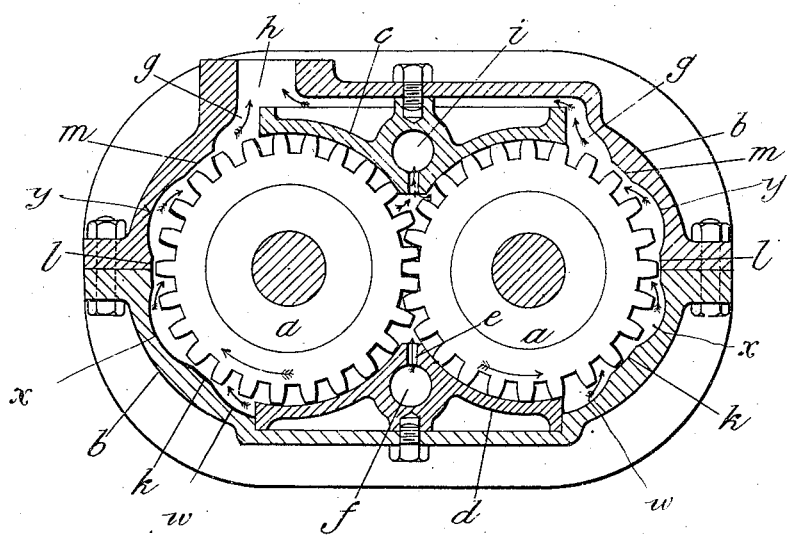

UNITED STATES PATENT OFFICE.

ROBERT FORD COURTENAY KEATS, OF PORTSMOUTH, ENGLAND.

ROTARY ENGINE.

981,862. Specification of Letters Patent. Patented Jan. 17, 1911.

Application filed November 12, 1910. Serial No. 591,961.

*To all whom it may concern:*

Be it known that I, ROBERT FORD COURTENAY KEATS, a subject of the King of Great Britain, residing at 9 Garnier street, Fratton, Portsmouth, in the county of Hampshire, England, have invented a new and useful Rotary Engine, of which the following is a specification.

This invention relates to improvements in rotary engines of the type in which two toothed wheels which mesh with one another are rotated in two chambers side by side by the pressure of steam or other fluid delivered between the wheels near to the plane through their axes.

The accompanying drawing is a transverse section of an engine made in accordance with this invention.

$a\ a$ are the two wheels rotating in chambers $b$ provided with blocks or abutments $c\ d$, which fit steam tight to the teeth of the wheels and should be adjustable to take up wear.

$e$ is the admission port from the supply pipe $f$.

$g\ g$ are exhaust ports leading to a common pipe $h$ and $i$ is an exhaust port common to the two wheels.

$k\ l\ m$ are three projections on the inside of either casing $b$, the clearance between the projections $l$ and the teeth of the wheels being greater than that at $k$ and that at $m$ being greater than that at $l$.

$w, x, y$ indicate depressions or recesses on the inside of the walls of the chambers into which steam expands before passing the projections $k, l, m$.

The projections $k\ l\ m$ cause the fluid to impinge again and again upon the teeth of the wheels and increase the efficiency of the engine.

What I claim is:—

1. In a rotary engine, the combination of two chambers side by side, two toothed wheels in the chambers meshing with one another, an inlet port for the motive fluid delivering to the intermeshing portions of the wheels, an abutment fitting steamtight to the wheels on opposite sides of the inlet, an abutment fitting steamtight to the wheels at their intermeshing portions on the exhaust side of the engine, an exhaust port for each chamber, a projection interposed between the exhaust port of one of the chambers and the abutment therein next the inlet port, and a recess in the chamber walls between the projection and said abutment into which the motive fluid carried around by the teeth of the wheel in said chamber expands after leaving the abutment and before passing the projection.

2. In a rotary engine, the combination of two chambers side by side, two toothed wheels in the chambers meshing with one another, two abutments fitting steam tight to the teeth of the wheels, a fluid inlet between the wheels, an exhaust port in each chamber, and a series of projections on the inside of the casing of each chamber between the first abutment and the exhaust port, the clearance between the projections and the teeth of the wheels increasing from the inlet to the exhaust port.

ROBERT FORD COURTENAY KEATS.

Witnesses:
 ALBERT W. SWALM,
 CHARLES PACK.